(12) United States Patent
Rattunde

(10) Patent No.: US 12,722,194 B2
(45) Date of Patent: Sep. 1, 2026

(54) METHOD FOR STRAIGHTENING BAR-SHAPED MATERIAL AND A STRAIGHTENING MACHINE

(71) Applicant: RATTUNDE AG, Ludwigslust (DE)

(72) Inventor: Ulrich Rattunde, Ludwigslust (DE)

(73) Assignee: RATTUNDE AG, Ludwigslust (DE)

( * ) Notice: Subject to any disclaimer, the term of this patent is extended or adjusted under 35 U.S.C. 154(b) by 0 days.

(21) Appl. No.: 18/547,366

(22) PCT Filed: Dec. 8, 2022

(86) PCT No.: PCT/EP2022/084967
§ 371 (c)(1),
(2) Date: Aug. 22, 2023

(87) PCT Pub. No.: WO2023/131465
PCT Pub. Date: Jul. 13, 2023

(65) Prior Publication Data

US 2024/0131568 A1 Apr. 25, 2024
US 2024/0226980 A9 Jul. 11, 2024

(30) Foreign Application Priority Data

Jan. 5, 2022 (DE) .................... 10 2022 100 183.0

(51) Int. Cl.
*B21D 3/10* (2006.01)
*B21C 51/00* (2006.01)
*G01B 21/20* (2006.01)

(52) U.S. Cl.
CPC ................ *B21D 3/10* (2013.01); *B21C 51/00* (2013.01); *G01B 21/20* (2013.01)

(58) Field of Classification Search
CPC .... B21D 3/10; B21D 3/16; B21D 3/00; B21C 51/00; G01B 21/20; G01B 21/24; G01B 21/30; G01B 7/28; G01B 7/281
See application file for complete search history.

(56) References Cited

U.S. PATENT DOCUMENTS 3,481,170 A 12/1969 Galdabini
4,531,391 A * 7/1985 Engman ................. G01B 7/282 72/702

FOREIGN PATENT DOCUMENTS

CN 113828656 A * 12/2021 .............. B21D 3/10
DE 1627511 A1 2/1971

(Continued)

OTHER PUBLICATIONS

International Search Report, PCT/EP2022/084967, Mar. 31, 2023, 6 pages.

(Continued)

*Primary Examiner* — Jared O Brown
(74) *Attorney, Agent, or Firm* — Bay State IP, LLC

(57) ABSTRACT

A method for straightening non-straight bar-shaped material (1) by determining a target plastic deformation (s_soll) at a forming position (12) of the bar-shaped material (1), moving a straightening hammer (8) with integrated measuring probe (7) to the forming position (12), a first forming stroke (h_1) of the straightening hammer (8) is carried out, an actual plastic deformation (s_ist) caused by the first forming stroke (h_1) is determined by means of the integrated measuring probe (7), a second forming stroke (h_2) is determined from the actual plastic deformation (s_ist) caused by the first forming stroke (h_1) and the target plastic deformation (s_soll).

18 Claims, 6 Drawing Sheets

(56) References Cited

FOREIGN PATENT DOCUMENTS

Figure 1:
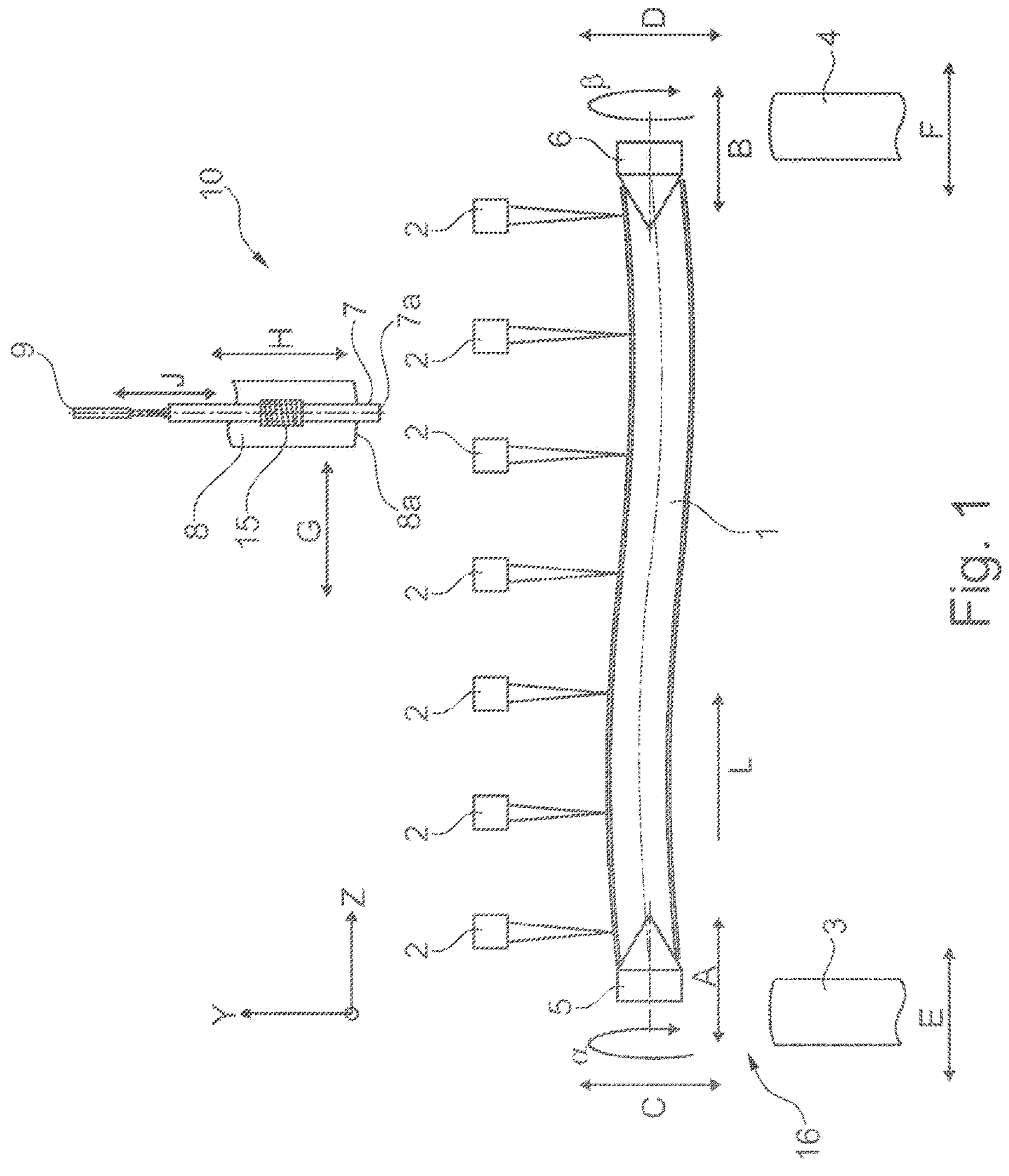

| | | | |
|---|---|---|---|
| DE | 2524310 | A1 | 12/1976 |
| DE | 2524310 | B2 | 6/1978 |
| DE | 3211489 | A1 | 11/1982 |
| DE | 102005027610 | A1 | 12/2005 |
| DE | 102005027640 | A1 | 12/2005 |
| DE | 102005021946 | A1 | 11/2006 |
| EP | 2055403 | A2 | 5/2009 |
| JP | 57177831 | A | 11/1982 |

OTHER PUBLICATIONS

Deep Learning with Python and Keras (ISBN 978-3-95845-838-3).

International Office Action, German Patent and Trademark Office, Nov. 23, 2022.

International Office Action, Japan Patent Office, Apr. 15, 2025.

International Search Report, Europaisches Patentamt, Mar. 31, 2023.

* cited by examiner 6
1
4

8
H
12
J
7
Z
Y
5
3

METHOD FOR STRAIGHTENING BAR-SHAPED MATERIAL AND A STRAIGHTENING MACHINE

The invention relates to a method for straightening non-straight bar-shaped material by determining a target plastic deformation at a forming position of the bar-shaped material.

The invention also relates to a straightening machine for non-straight bar-shaped material for carrying out a target plastic deformation at a forming position of the bar-shaped material with a control.

Bar-shaped materials, for example tubes, profiles, solid profiles, are processed in cutting machines. Shorter sections are cut from the long starting material, which may have lengths of 12 metres, for example. These shorter sections can be two metres long, for example.

Basically, the pre-materials are not exactly straight. It follows that the cut-to-length sections are also not exactly straight. In the following, "exactly straight" is also referred to as "straight".

The straightness of the starting material depends on the material, the production, the quality of the material, the straightening processes on multi-roll straightening machines, the transport, the finishing and much more. A minimum straightness is often required for the cut-to-length sections, for example for sections for camshafts, engine shafts or cardan shafts. As a rule, it is technically impossible or extremely costly to realise the straightness already in the pre-material.

Straightening machines are used to produce the sections with the required straightness. Basically, the sections are measured for straightness and the sections that are outside a predefined tolerance are fed to the straightening machine. The straightening machine then straightens the sections and feeds the straightened sections back into the normal process sequence, where the straightness can again be checked. Only the workpieces that achieve the required straightness before or after the straightening process are then output as good parts in the material flow.

In the prior art, straightening machines with a straightening anvil on the right and a straightening anvil on the left and one or more straightening hammers in between are known, for example, from DE10 2005 021 946 A1. First, the workpiece is clamped on both sides, for example between centres, and measured in a rotating, tactile or contactless manner. A suitable computing unit calculates the straightness of the workpiece. A deviation profile is determined. The calculation unit also calculates the necessary deformations and support points to achieve the straightness tolerance. Then the workpiece is placed on the straightening anvils according to the previously calculated target values and plastically deformed with the straightening hammer until the workpiece achieves the required straightness.

In order to plastically deform the section, it is necessary to exceed the elastic range of deformation with the straightening hammer. Only after elastic deformation does plastic deformation take place and remain permanently. The forming stroke of the straightening hammer must correspond to the elastic deformation plus the plastic deformation. When the straightening hammer relieves the section again, essentially the elastic deformation component springs back and only the plastic deformation component remains. How large the plastic deformation should be at the forming position is known from the previous measurements of the straightness and the calculation of the straightness function in the calculation unit.

The problem, however, is that a function between the elastic portion and the plastic portion of the forming stroke is not constant or does not obey an exact known function. The function depends on many conditions, such as residual stresses in the material, strain hardening, material fluctuations, which are not constant and therefore not predictable even within the length of the pre-material.

It is therefore known by means of measurement and mathematical calculation how much and where the workpiece must be deformed in order to achieve the specified tolerance, but it is not known how large the associated target stroke of the straightening hammer must certainly be. With statistical methods it is possible to predict the target stroke, but there is then also a considerable probability that the material will be plastically deformed too little or too much. The disadvantage is either accepted or the workpiece is lifted off the straightening anvils again, measured and placed back on the straightening anvils and straightened again. This is disadvantageously very time-consuming.

Therefore, in a first aspect, it is an object of the invention to provide a method of straightening non-straight bar-shaped material which at least reduces the above disadvantages.

In a second aspect, it is an object of the present invention to provide a straightening machine for non-straight bar-shaped material which reduces the above disadvantages.

The object is fulfilled in its first aspect by a method for straightening non-straight bar-shaped material, comprising:

providing a straightening machine comprising a straightening hammer including a measuring probe, determining a target plastic deformation at a forming position of the bar-shaped material, moving the straightening hammer to the forming position, carrying out a first forming stroke using the straightening hammer, determining an actual plastic deformation caused by the first forming stroke using the integrated measuring probe, determining a second forming stroke from the actual plastic deformation caused by the first forming stroke and the target plastic deformation), further comprising, after the first forming stroke, generating a characteristic diagram which displays the target plastic deformation and a characteristic curve of the bar-shaped material determined from the actual plastic deformation; wherein the second forming stroke is further determined from the characteristic curve and corresponds to a deformation stroke to the target plastic deformation along the characteristic curve.

First, one or more target plastic deformations are determined at one or more forming positions of the bar-shaped material by measuring methods and mathematical methods. The forming position is understood here to be the position or the area on the material that is acted upon with a forming force in order to achieve a deformation of the material. The measurement methods and mathematical methods for this are state of the art and are known, for example, from Deep Learning with Python and Keras (ISBN 978-3-95845-838-3).

According to the invention, a straightening hammer with integrated measuring probe is moved next to or onto the forming position. An integrated probe is generally understood to mean that the hammer and the integrated probe are connected to each other. The integrated probe is physically arranged in the straightening hammer in such a way that the probe is preferably arranged in the centre of a pressure surface of the straightening hammer. The pressure surface of the straightening hammer meets the forming position of the material during the forming process caused by the forming stroke.

A first forming stroke of the straightening hammer is carried out and an actual plastic deformation caused by the first forming stroke is measured by means of the integrated measuring probe. If necessary, a second forming stroke or further strokes are determined from the actual plastic deformation caused by the first forming stroke and the target deformation.

Preferably, for the determination of the first forming stroke, a characteristic diagram is provided which specifies an actual plastic deformation range for the material for each possible forming stroke, within which the actual deformation lies with a high degree of probability. Preferably, the maximum limit of the actual plastic deformation range is selected as the forming stroke. However, the forming stroke can also be selected within the upper 10%, 9% or any lower value within the actual plastic deformation range.

This takes into account the fact that for a given target plastic deformation to be performed at the forming position of the bar-shaped material, it is not possible to predict with certainty which forming stroke must be performed. Rather, it is known from statistical methods, empirical values and evaluation by artificial intelligence and machine learning that a specific first forming stroke produces deformations within a actual plastic deformation range, i.e. within the characteristic diagram.

The straightening hammer acts on the forming position with a first forming stroke. As a result, the bar-shaped material is first elastically and then plastically deformed. After the straightening hammer is released, the elastic part springs back and the actual plastic deformation remains. However, this cannot be predicted with certainty during the specified first forming stroke.

However, since the actual deformation range is known, i.e. which actual deformation is achieved within a certain range by a certain forming stroke with a very high probability, i.e. 99-99.9% or higher, the target deformation is favourably selected as a high value, preferably as the maximum value of the actual deformation range.

This means that the target deformation is determined by the known methods, and the target deformation is assigned the first forming stroke whose actual deformation span is such that its maximum value corresponds to, i.e. equals, the target deformation. However, other assignments are also conceivable in principle. For example, the target deformation can be in the upper tenth, fifth, etc. of the actual deformations generated by the first forming stroke.

Advantageously, the first forming stroke performs an elastic deformation of the material and an actual deformation within the actual plastic deformation range.

Since the first forming stroke is favourably and carefully selected in such a way that the actual deformation produced by the first forming stroke only corresponds to the target deformation in the best case and the target deformation is the maximum value of the actual deformation range, the actual plastic deformation produced by the first forming stroke will be below the target plastic deformation in the majority of cases. A second forming stroke is therefore necessary.

The actual deformation generated by the first forming stroke is measured by the integrated measuring probe and evaluated together with the target deformation. Conveniently, a characteristic curve within the characteristic field is determined by the actual deformation, and the characteristic curve is selected to determine the second forming stroke.

The method step makes use of the idea that the actual deformation cannot be predicted with certainty for a given forming stroke in a certain configuration, but only an actual deformation range can be specified, which is recorded in the characteristic diagram. However, the actual deformation can be predicted much more precisely by a second forming stroke if the measurement data of a previous first deformation are evaluated at the forming position for which an actual deformation has already been performed.

It has been found that within the characteristic diagram a characteristic curve can be determined quite accurately or preferably quite precisely for a specific forming position if the actual plastic deformation for a first forming stroke already carried out is known for this forming position. The characteristic curve is precisely determined by the zero point as well as the actual deformation for the first forming stroke carried out, and it is used according to the invention to determine the second forming stroke.

Advantageously, the characteristic curve specifies the second forming stroke more precisely, preferably exactly, at the specified target plastic deformation.

Preferably, a characteristic curve of the bar-shaped material within the characteristic diagram is determined from the actual deformation after the first forming stroke, which leads through the zero point and the measured actual deformation. The characteristic curves basically have a comparable course within the characteristic diagram. Therefore, the characteristic curve for the forming position can already be determined by a single measurement.

The second forming stroke is determined from the characteristic curve. The second forming stroke corresponds to the point of intersection of the characteristic curve with the target deformation.

In a preferred embodiment of the process according to the invention, the target deformation at a forming position of the bar-shaped material is determined during the process by means of the integrated measuring probe. The bar-shaped material is clamped. A zero position of the straightening hammer is determined and stored. A first measured value of the integrated measuring probe in the zero position of the straightening hammer is determined and stored. The first forming stroke of the straightening hammer is carried out. The straightening hammer is then moved back to the zero position, and a second measurement value of the integrated probe in the zero position of the straightening hammer is determined, and an actual plastic deformation of the bar-shaped material due to the first forming stroke at the forming position is determined from the first and second measurement values of the integrated probe.

Advantageously, the integrated probe only has to determine a difference value in its first and in its second measurement, from which the actual plastic deformation caused by the first forming stroke can be determined. This can preferably be done by the integrated probe determining a distance between a measuring head of the integrated probe and the forming position on the outer surface of the bar-shaped material in a first and a second measurement and forming a difference value from this.

Preferably, a tolerance range is specified which determines how far the bar-shaped material may deviate from the straight bar-shaped material, and if, after the first forming stroke has been carried out, a difference between the actual plastic deformation and the target plastic deformation at the forming position lies outside the tolerance range, a second forming stroke is carried out at the forming position. If necessary, a third and fourth forming stroke can also be carried out.

Preferably, an actual outer surface of the bar-shaped material is first measured and a deviation profile of the actual outer surface from a straight target outer surface is determined. The deviation profile is used to determine the forming position to which the first forming stroke is applied. In addition to the forming position, one, two or more contact points of the bar-shaped material on anvils are usually determined, as well as their distance.

The forming position is determined from the deviation profile and as an angular position about the longitudinal axis of the bar-shaped material and as a position along a travel axis of the straightening hammer along the longitudinal direction of the straightening machine. The control of the machine then allows the bar-shaped material, preferably clamped between two holders, to be rotated about the longitudinal axis to the angular position determined from the deviation profile and then to move the hammer next to the bar-shaped material along a traversing axis running in the longitudinal direction until the straightening hammer is positioned directly on the forming position and can act on the forming position to perform the first forming stroke.

Conveniently, a target deformation is determined in a known manner from the deviation profile at the forming position and the first forming stroke, which is assigned to the target deformation, is determined from the characteristic diagram as described above.

Conveniently, the bar-shaped material is placed on two spaced anvils and the forming position is arranged longitudinally between the two anvils.

The object is solved in its second aspect by a straightening machine for non-straight, bar-shaped material for carrying out a target plastic deformation at a forming position of the bar-shaped material, comprising:

- a control system for a traversing device with a straightening hammer with integrated measuring probe, including a memory for storing a characteristic diagram which displays an actual plastic deformation span for the material for a plurality of forming strokes,
- wherein the control system is configured to:
- determine a first forming stroke from the target plastic deformation,
- the integrated measuring probe measures an actual plastic deformation caused by the first forming stroke and feeds its measured values to the control via a data-conducting connection, determine a characteristic curve within the characteristic diagram from the actual deformation, and
- determine a second forming stroke from the target plastic deformation and the characteristic curve.

The straightening machine is suitable for carrying out one of the above-mentioned processes. Conversely, the above-mentioned processes are suitable for carrying out with one of the straightening machines described below.

What has been said with regard to the method is also considered to be disclosed mutatis mutandis for the straightening machine.

The straightening machine according to the invention for a non-straight, bar-shaped material is suitable for carrying out a target plastic deformation at a forming position of the bar-shaped material. It comprises a control for a traversing device with a straightening hammer with integrated measuring probe. The control system advantageously comprises a computing unit and a memory. A characteristic diagram is stored in the memory, which specifies an actual deformation range for the material for each forming stroke, within which the actual deformation lies with a high probability, i.e. of more than 95%, 96%, preferably 99% or more.

The control unit advantageously determines the first forming stroke from the target deformation with its computing unit, advantageously with the help of the characteristic diagram. The target deformation is preferably within the upper 10% or less, preferably a maximum value within the actual deformation range. However, other arrangements between the actual plastic deformation range and the target plastic deformation are also conceivable.

Advantageously, the first forming stroke is selected in such a way that, for the given material, an actual plastic deformation is carried out by the first forming stroke which is below the determined target plastic deformation, at least with a high probability of 95% or more, preferably 99% or more percent. Over-deformation should preferably be avoided.

The integrated measuring probe according to the invention measures an actual plastic deformation caused by the first forming stroke and transmits its measured values to the control via a data-conducting connection. Due to the actual deformation actually determined for the specific forming position on the basis of the actual forming stroke, the characteristic diagram can be restricted to a characteristic curve. A characteristic curve within the characteristic diagram can be determined from the actual deformation. As described above, the control system can then determine a second forming stroke from the target deformation and the characteristic curve. The second forming stroke is the value on the characteristic curve that generates the target deformation, i.e. after which the target deformation is ideally achieved or, if this is not yet the case, at least only a plastic underdeformation is achieved and the process cycle described above is run through a second time.

Preferably, the straightening machine comprises at least two anvils spaced from each other in a longitudinal direction for supporting the bar-shaped material. The bar-shaped material can preferably be placed on the two anvils and is thereby advantageously clampable by two holders which are arranged opposite each other and rotatable. Between the two opposing holders, measuring probes are advantageously arranged next to the clamped, bar-shaped material and make it possible to measure the actual outer surface of the bar-shaped material and to determine a deviation profile of the actual outer surface from the straight target outer surface. From this, as described above, the forming position for the straightening hammer and the contact points of the bar-shaped material on the anvils can be determined by already known methods.

Particularly preferably, the integrated measuring probe with a measuring head is guided centrally through the straightening hammer, whereby the measuring head enables a distance measurement beyond an impact surface of the straightening hammer. Advantageously, the distance between the measuring head and the forming position of the bar-shaped material can be determined. Advantageously, a first distance measurement is carried out before the first forming stroke is carried out and a second distance measurement is carried out after the first forming stroke has been carried out in order to determine the actual plastic deformation at the forming position caused by the forming stroke by forming the difference.

The straightening hammer is preferably arranged on an NC-controllable traversing axis transverse to the actual outer surface of the bar-shaped material. NC-controllable traversing axes are very precise and allow the straightening hammer to be controlled in the range of micrometres.

The rod-shaped material can advantageously be positioned on a receptacle. The receptacle can be conical.

However, it is also conceivable that the receptacle is only formed as a clear area between two opposing holders, whereby the holders can be, for example, two opposing tips between which the tubes are clamped and can be rotated.

Figure 2:
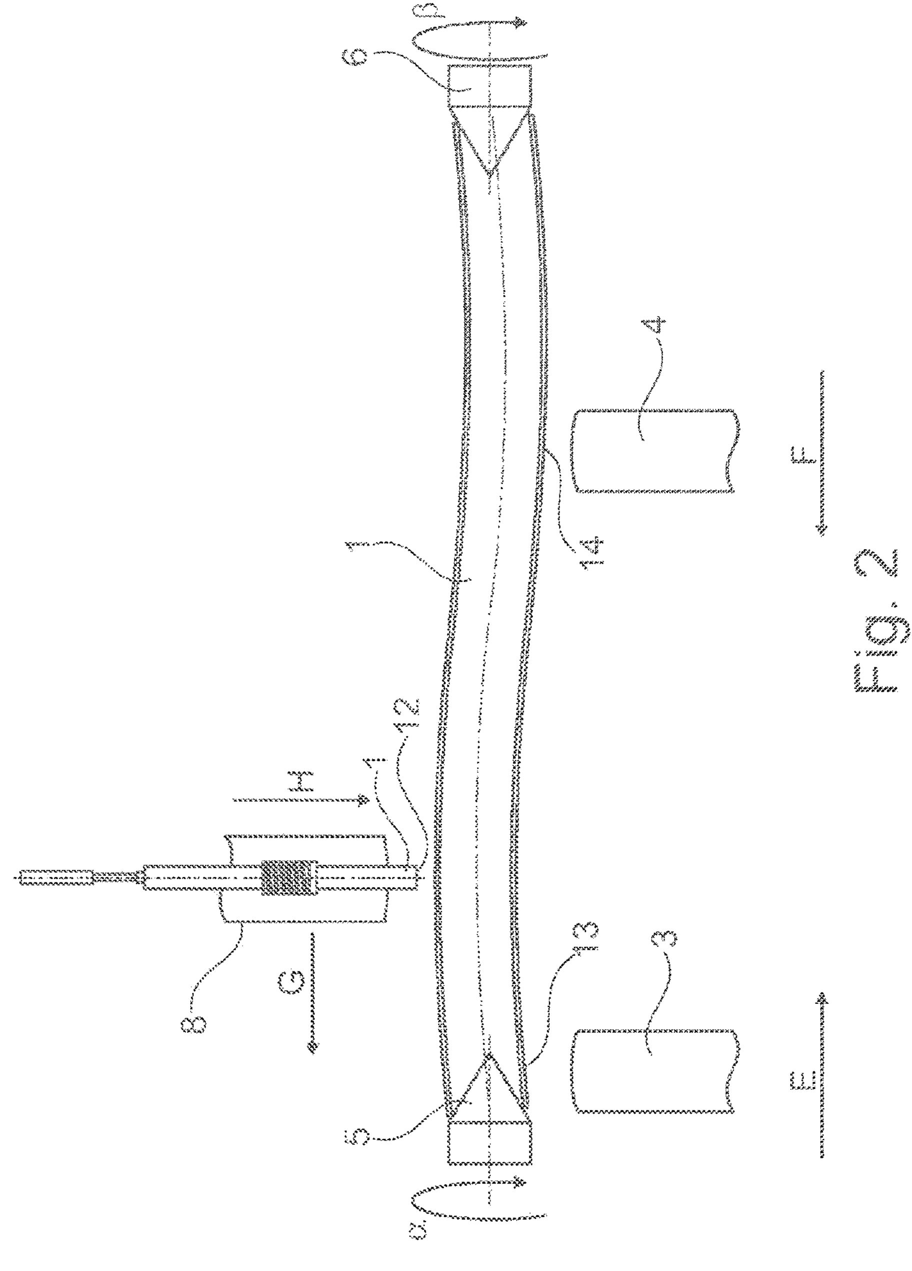
Figure 3:
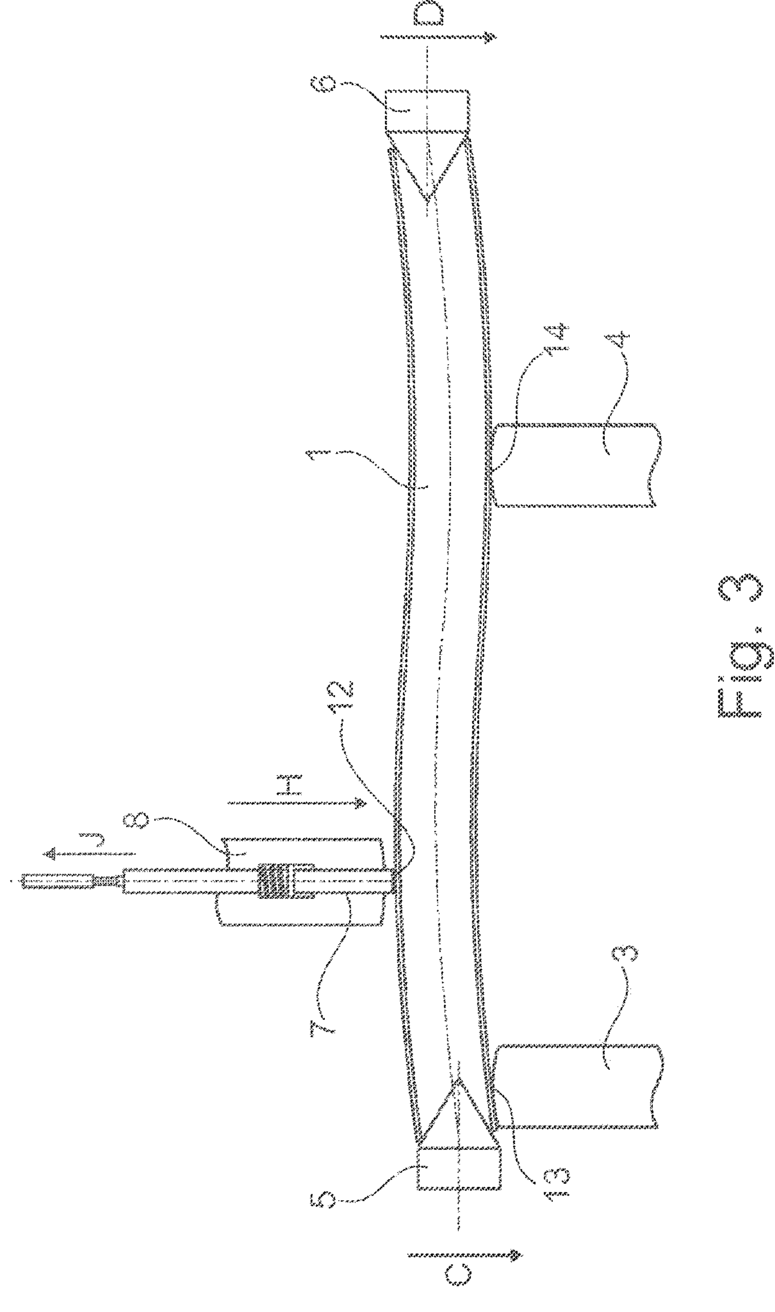
Figure 4:
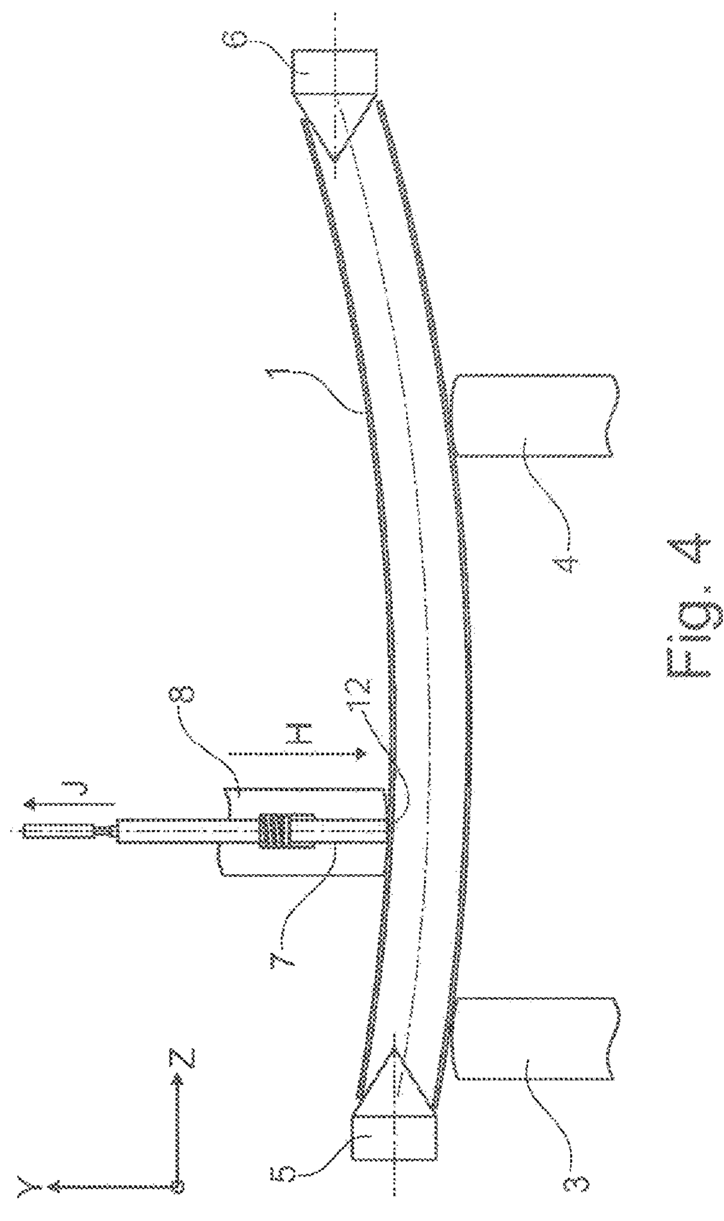
Figure 5:
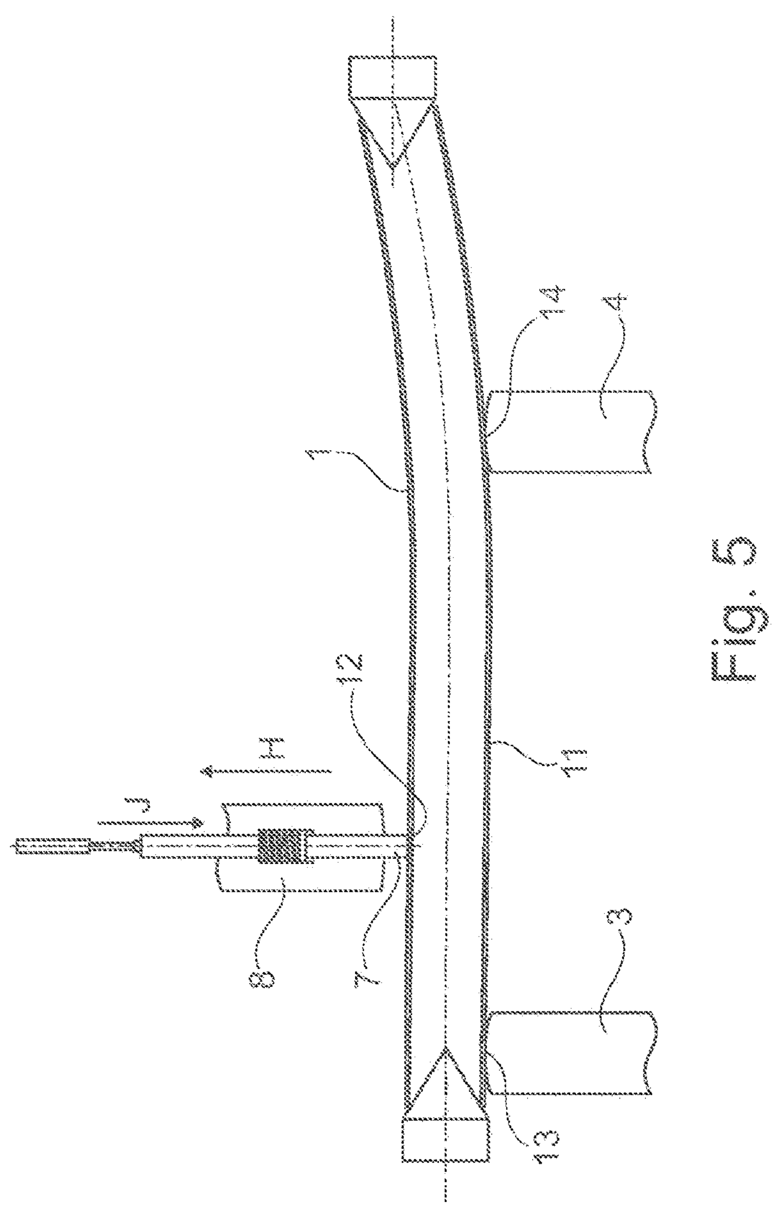
Figure 6:
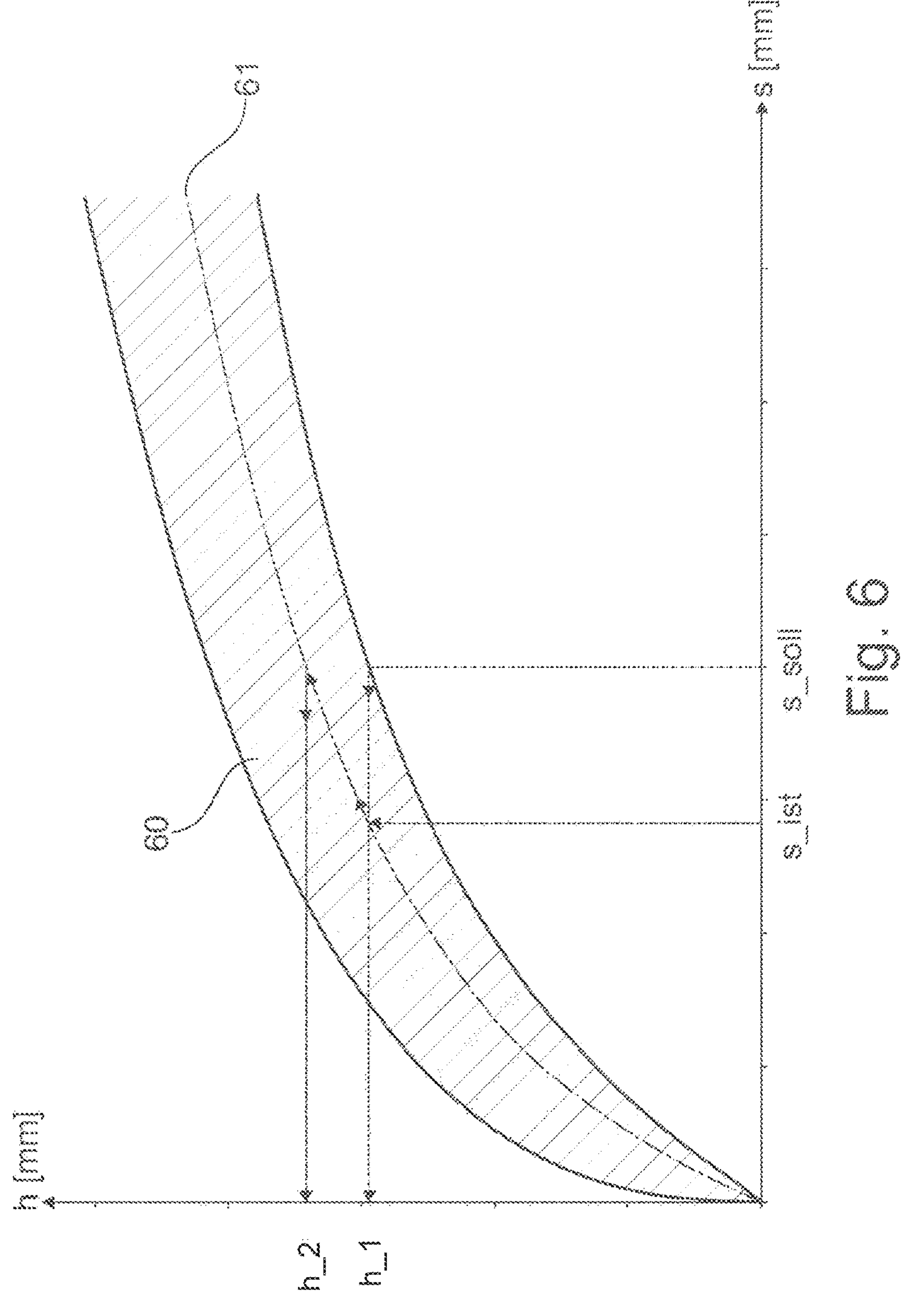

The invention is described by means of an embodiment example in six figures. Thereby show:

FIG. 1 a schematic construction of a straightening machine according to the invention for non-straight, bar-shaped material, FIG. 2 the straightening machine for non-straight, bar-shaped material of FIG. 1 in a first process step, FIG. 3 the straightening machine for non-straight bar-shaped material of FIG. 1 in a second process step, FIG. 4 the straightening machine for non-straight, bar-shaped material according to FIG. 1 in a third process step, FIG. 5 the straightening machine for non-straight bar-shaped material according to FIG. 1 in a fourth process step, FIG. 6 a map.

A straightening machine 10 shown schematically in FIGS. 1 to 5 and the process according to the invention carried out on the straightening machine 10 are used for straightening non-straight, bar-shaped material. By bar-shaped material is meant here in particular tubes, profiles, solid profiles etc. extending along a longitudinal direction L, which may preferably be circular in cross-section, but also angular, in particular square.

The embodiment example refers to a tube 1 without, however, being limited to it in any way. The tube 1 can have a length of several metres and diameters of several centimetres or decimetres. Other dimensions are also conceivable.

When viewed roughly, the tube 1 appears straight in the longitudinal direction L along its actual outer surface 11. On closer inspection, and this is the point of the present invention, the tube 1 is not straight.

The tube 1 shown in FIG. 1 is, for example, wave-shaped in a Y-direction. The wave form is not shown to scale here, but is greatly exaggerated. Usually, amplitudes of the waves formed in the tube are in the millimeter range or below for tube lengths of one to two metres. The wave extends along the longitudinal direction L, which here corresponds to the Z-direction. Wavelike bulges can also occur in an X-direction (not drawn in), which are superimposed on the waveform in the Y-direction. The bulges do not have to be wave-shaped.

The tube 1 has the actual outer surface 11, which deviates from the straight target outer surface extending in the longitudinal direction L. The deviation profile can be determined along the longitudinal direction L. A deviation profile can be determined along the longitudinal direction L by forming the difference between the actual outer surface and the target outer surface. For this purpose, the straightening machine 10 has a receptacle 16, on the end faces of which tool tips 5, 6 are arranged for tube clamping and tube rotation. The receptacle 16 can have a preferably conical support surface for supporting the tube 1. Here, the receptacle 16 is to be understood as the clearance between the two tool tips 5, 6. The tool tips 5, 6 are individually movable back and forth along traversing axes A and B, respectively, which are both arranged in the Z-direction. The tool tips 5, 6 can also be moved individually in the X-Y plane in FIG. 1. In FIG. 1 a traversing axis C is drawn for one tool tip 5 and a traversing axis D for the other tool tip 6, both running in the Y-direction. The two traversing axes in the X-direction of the two tool tips 5, 6 are not drawn. The two tool tips 5, 6 are arranged exactly opposite each other so that their axes of rotation run in extension of each other. The tube 1 can be clamped between them by moving the tool tips 5, 6 towards each other. The clamped tube 1 can itself be rotated by rotating the tool tips 5, 6.

Along the receptacle 16 located between the tool tips 5, 6, measuring probes 2 for measuring the straightness of the tube 1 are arranged at a distance from each other along the longitudinal direction L. The distance can be equidistant. The distances from each other can be equidistant. Different distances can also be selected. The probes 2 may also be arranged in cross-section perpendicular to the longitudinal direction L around the receptacle 16 and the tube 1 at different angles. The measuring probes 2 may be tactile or optical or otherwise designed. They enable distance measurements in the range with an accuracy of 0.1 μm or less. The measuring probes 2 for measuring the straightness of the tube 1 are connected in a data-conducting manner to a control system with a data memory in which, in particular, measured distance values of the individual measuring probes 2 to measuring points on the outer surface 11 of the tube 2 are stored. The straightness of the tube 1 is measured in such a way that the tube 1 is clamped as shown in FIG. 1, the measuring probes 2 each carry out a first distance measurement, the tube 1 is rotated a short distance by an angle α, β, the measuring probes 2 carry out a second distance measurement in the rotated angular position, the tube 1 is rotated by a further angle α, β and the measuring probes 2 carry out a third distance measurement, and so on. The distance measurement values are stored and evaluated together with the position of the probe 2 along the longitudinal direction L and the angular position, and the actual outer surface 11 of the tube 1 is determined. The actual outer surface 11 of the tube 1 deviates from the straight target outer surface of the tube 1. In FIG. 1 the tube 1 is shown exaggeratedly curved.

Usually, deviations from straightness with a predefined tolerance of 1 μm or less are tolerated for further processing of the tubes 1. Non-straightness outside the tolerance range is sorted out and straightened according to the invention. The tube 1 is straightened by the straightening machine 10 according to the invention to get back within the tolerance range.

The straightening of the tube 1 is preferably carried out with the aid of two anvils 3, 4, which are shown schematically in FIG. 1, and by means of a straightening hammer 8 according to the invention, in which an integrated measuring probe 7 is arranged centrally. The straightening hammer 8 is a cylindrical structure with a central bore, preferably a central circular bore, in which the tactile or optical integrated measuring probe 7 is preferably embedded. The integrated measuring probe 7 can be moved back and forth along a vertical travel axis J within the straightening hammer 8 relative to the straightening hammer 8 and can disappear in the straightening hammer 8 with a measuring surface **7*a* aligned with a striking surface 8*a* of the straightening hammer 8**.

The integrated measuring probe 7 is mounted in the straightening hammer 8 with a return spring 15, which pushes the measuring surface **7*a* out of the striking surface 8*a*** in the load-free state.

According to FIG. 1, the straightening hammer 8 can be moved along a vertical traversing axis H towards and away from the tube 1, it can be moved along a horizontal traversing axis G along the longitudinal direction L of the tube 1 and can also be moved along a (not drawn) horizontal traversing axis perpendicular to the longitudinal direction L. The measuring surface **7*a* of the measuring probe 7, as shown in FIG. 1, can also be moved parallel to the traversing axis H of the straightening hammer 8**, preferably very easily, i.e. almost without resistance.

FIG. 2 shows the arrangement of the straightening hammer 8, the measuring probe 7 as well as the two anvils 3, 4 and the tube 1 clamped between the tool tips 5, 6 immediately before straightening. The two anvils 3, 4 can be moved back and forth along the longitudinal direction L along traversing axes E, F.

From the deviation profile of the actual from the target outer surface of the tube 1, a forming position 12 of the straightening hammer 8 on the tube 1 and support points 13, 14 of the tube 1 on the anvils 3, 4 and thus calculates positions of the traversing axis G and angles α, β of the two angular tips 5, 6 and the required target deformations of the tube 1 at the forming position 12 in order to straighten the tube when the tube 1 is supported between the two anvils 3, 4 spaced at a certain distance from each other.

The problem is that the target deformation at the forming position 12 of the tube 1 and a forming stroke h of the straightening hammer 8 cannot be clearly assigned to each other.

The straightening process in the prior art is basically always the same process. In order to plastically deform the tube 1, it is first necessary to exert the forming stroke h on the tube 1 with the straightening hammer 8 and to exceed the elastic range of deformation. Only after the elastic deformation does a plastic deformation s take place. The forming stroke h of the straightening hammer 8 must basically correspond to the elastic deformation plus the plastic deformation s. When the straightening hammer 8 is moved back again and the tube 1 is unloaded, the elastic deformation component essentially springs back and only the plastic deformation component remains, which here also corresponds to the actual plastic deformation s_ist.

It is known in principle how large the plastic deformation s at the forming position 12 should be in order to achieve sufficient straightness of the tube 1 by straightening. However, no function between the elastic deformation component and the plastic deformation component of the forming stroke h is known. The function between elastic deformation component and plastic deformation component depends on many conditions, especially on the properties of the material, work hardening or other material variations. However, they are so different that even within a length of a tube 1 the function between elastic portion and plastic portion is not predictable. It is therefore not known with certainty which forming stroke h must be performed by the straightening hammer 8 in order to achieve a target deformation s_soll. Although statistical methods can be used to predict the possible forming stroke h, there is then also a considerable probability that the tube 1 will be plastically deformed too much or too little. If overforming occurs, the tube 1 would have to be measured again, lifted off the anvils 3, 4, rotated and put down again, and straightened again. This is time-consuming.

FIG. 6 schematically shows the idea of the procedure carried out in FIGS. 2, 3, 4, 5. FIG. 6 first shows a given characteristic diagram 60, which can be obtained by statistical methods in connection with artificial intelligence, machine learning, etc., for example according to Deep Learning with Python and Keras (ISBN 978-3-95845-838-3). There, the statistical connection between the forming stroke h of the straightening hammer 8 and the plastic deformation s generated by the forming stroke h for a certain material is shown. The distances between the two anvils 3, 4 and the position of the straightening hammer 8 are also included in the characteristic diagram 60. The characteristic diagram 60 is to be read in such a way that, when a first forming stroke h_1 is carried out, an actual plastic deformation s_ist is within a deformation span b along the X-axis within the characteristic diagram 60. The actual plastic deformation s_ist is located within the deformation span b with a probability of 95%, 99%, 99.9%. The width of the characteristic diagram 60, i.e. the length of the deformation span b in the X-direction, depends primarily on the material properties. The width depends in particular on residual stresses in the material, strain hardening or other material fluctuations. On the other hand, although the global shape of the characteristic diagram 60 also depends on how far apart the anvils 3, 4 are from each other, what diameter the tube 1 has, what wall thickness the tube 1 has, etc., these are all parameters that allow an exact bending behaviour to be predicted and do not significantly influence the width of the characteristic diagram 60 as such. They only influence the global shape, i.e. the gradient of the characteristic diagram 60, etc.

Furthermore, it is known that the actual deformation s_ist of a bar-shaped material, in particular of the tube 1, which is subjected to a different first forming stroke h at a forming position 12, follows a characteristic curve 61 which moves within the characteristic diagram 60 shown in FIG. 6. The characteristic curve 61 is inserted into the characteristic diagram 60. It has been found that the characteristic curve 61 within the characteristic diagram 60 can also be precisely specified in real terms by two points.

The process according to the invention proceeds as described below.

The tube 1 is positioned on the anvils 3, 4 at a certain angle α, β in a known manner according to FIG. 2. The forming position 12 of the straightening hammer 8 and the support points 13, 14 on the anvils 3, 4 are known. In a first process step according to FIG. 2, the straightening hammer 8 is arranged above the forming position 12 by means of the traversing axis G. The straightening hammer 8 is positioned on the anvils 3, 4. It is known how large the target plastic deformation s_soll at the forming position 12 must be in order to be able to provide a tube 1 that is as straight as possible after the straightening process.

In a second process step, as shown in FIG. 3, the straightening hammer 8 is moved along the traversing axis H in the direction of the forming position 12 of the tube 1 until the measuring surface **7*a* of the probe 7 touches the outer surface of the tube 1. However, the probe 7 does not exert any pressure on the forming position 12 which would already bend the tube. The straightening hammer 8 is in the zero position. The zero position is determined and its coordinates are recorded. A first measurement is now carried out in the zero position by the measuring probe 7 and the first measured values of the measuring probe 7 are stored. For example, the measurement data is recorded as to how far away the measuring surface 7*a* of the measuring probe is from the striking surface 8*a* in the Y-direction or a similar measurement. The first measurement values are measurement values that determine the distance between the forming position 12 and the striking surface 8*a* of the straightening hammer 8. However, this need not be so, it is only important that the position of the forming position 12 relative to the straightening hammer 8** is recorded.

In a third process step, the first forming stroke h_1 is applied to the forming position 12 as shown in FIG. 4.

The first forming stroke h_1 is determined in advance from the known target deformation s_soll at the forming position 12. For this purpose, the intersection of the target deformation s_soll with the lower, minimum limit of the characteristic diagram 60 is determined according to FIG. 6. The intersection point determines the first forming stroke h_1. The selected first forming stroke h_1 statistically generates a target deformation s_soll in the deformation span b for the material. Through the first forming stroke h_1, the target deformation s_soll is only achieved in the best case. If this is not the case, an actual deformation s_ist is produced which is below the target deformation s_soll within the deformation span b. The tube 1 is therefore deformed less than it should actually be deformed.

The deformation process is carried out as shown in FIG. 4 by the straightening hammer 8, which is firmly mounted on an NC-controllable axis H. The straightening hammer 8 is moved by the first forming stroke h_1 in the opposite direction to the Y-direction. The straightening hammer 8 is moved against the Y-direction by the first forming stroke h_1 by means of the NC-controllable axis H as shown in FIG. 4 and bends the tube 1 to some extent as shown in FIG. 4. The bending contains an elastic and a plastic part.

In FIG. 5 the straightening hammer 8 has moved back again and the elastic deformation has receded. The plastic deformation s has remained and straightens the tube 1.

The information acquisition according to the invention is carried out by the measuring probe 7. Then, in a fourth process step, the straightening hammer 8 is moved back according to FIG. 5, the tube 1 is relieved, the straightening hammer 8 is moved back to the zero position according to FIG. 3, and a second measurement is carried out by means of the measuring probe 7, and second measured values are determined. The second measured values are compared with the first measured values of the measuring probe 7, and from the difference of the measured values, for example the difference of the distances of the forming position 12 from the striking surface 8*a* of the straightening hammer 8, the actual deformation s_ist is determined after the first forming stroke h_1.

The inventive idea is to use the information about the first actual deformation s_ist to narrow down the characteristic diagram 60 considerably in order to be able to execute a second forming stroke h_2 much more precisely and to get very close to the target deformation s_soll.

The actual plastic deformation s_ist after the first forming stroke h_1 does not usually correspond to the target plastic deformation s_soll, but is lower than the target deformation s_soll. However, the measurements of the measuring probe 7 allow to indicate a concrete value for the actual deformation s_ist which was generated by the first forming stroke H_1, so that according to FIG. 6 an actual deformation s_ist which actually took place can be assigned to the first forming stroke h_1, and thus the characteristic curve 61 within the characteristic diagram 60 in FIG. 6 can be assigned to the forming position 12 with its specific material properties. The characteristic curve 61 shows the plastic deformation behaviour at different strokes h for the forming position 12.

In a further process loop, according to FIGS. 3, 4, 5, the tube 1 is straightened at the forming position 12 by means of the second forming stroke h_2. The size of the second forming stroke h_2 is determined from the characteristic curve 61 in FIG. 6 and its point of intersection with the target deformation s_soll.

If necessary, the process loop can also be carried out a third or fourth time. In the real implementation of the process, it has been shown that several process loops are necessary. However, it has also been shown that specified straightness tolerances can be maintained with a high degree of certainty by this process, which iteratively approaches the target deformation s_soll.

LIST OF REFERENCE SIGNS

1 Tube/rod-shaped material
2 Probes
3 Amboss
4 Amboss
5 Tool tip
6 Tool tip
7
7*a* Measuring surface
8 Judging hammer
8*a* Stroke surface
10 Straightener
11 Actual external surface
12 Forming position
13 Support point
14 Support point
15 Return spring
16 Receptacle
60 Known field
61 Characteristic
b Deformation span
h Forming stroke
h_1 First forming stroke
h_2 Second forming stroke
s Plastic deformation
s_ist Plastic deformation
s_soll Target deformation
A Travel axis
B Travel axis
C Travel axis
D Travel axis
E Travel axis
F Travel axis
G vertical travel axis
H horizontal travel axis
J Travel axis
L Longitudinal direction
α Angle
β Angle

The invention claimed is:

1. A method for straightening non-straight bar-shaped material (1), comprising:

providing a straightening machine comprising a traversing device including a straightening hammer (8) with an integrated measuring probe (7), and a control system including a memory configured to store a characteristic diagram (60) which displays a target plastic deformation (s_soll), an actual plastic deformation span for the bar-shaped material (1) for a plurality of forming strokes, an actual plastic deformation (s_ist), and a characteristic curve (61) for the bar-shaped material determined from the actual plastic deformation, determining the target plastic deformation, using the control system, at a forming position (12) of the bar-shaped material (1), controlling the straightening hammer to move to the forming position (12), controlling the straightening hammer, using the control system, to carry out a first forming stroke (h_1), controlling the measuring probe (7), using the control system, such that the measuring probe determines an actual plastic deformation (s_ist) caused by the first forming stroke (h_1) and feeds a measured value of the actual plastic deformation to the control system, generating the characteristic diagram (60), using the control system, after the first forming stroke (h_1), determining a second forming stroke (h_2), using the control system, from the actual plastic deformation (s_ist) caused by the first forming stroke (h_1), the target plastic deformation (s_soll), and the characteristic curve (61).

2. The method according to claim 1, wherein the characteristic diagram (60) further displays a plastic deformation span for the bar-shaped material (1) for each forming stroke (h_1, h_2).

3. The method according to claim 2, further comprising selecting the target plastic deformation (s soll) within an upper 10% of the plastic deformation span.

4. The method according to claim 1, wherein the step of carrying out the first forming stroke (h_1) comprises causing elastic deformation of the bar-shaped material (1) and the actual plastic deformation (s_ist) within the plastic deformation span.

5. The method according to claim 2, wherein the first forming stroke (h_1) is associated with the plastic deformation span which includes a maximum value corresponding to the target plastic deformation (s_soll), and the actual plastic deformation (s_ist) generated by the first forming stroke (h_1) defines a characteristic curve (61) within the characteristic diagram (60), and the characteristic curve (61) is selected for determining the second forming stroke (h_2).

6. The method according to claim 1, further comprising:

clamping the bar-shaped material (1), determining a zero position of the straightening hammer (8), determining a first measured value of the integrated measuring probe (7) in the zero position of the straightening hammer (8), after the step of carrying out the first forming stroke (h_1) of the straightening hammer (8), moving the straightening hammer (8) back to the zero position, determining a second measured value of the measuring probe (7) in the zero position of the straightening hammer (8), wherein the step of determining the actual plastic deformation (s_ist) of the bar-shaped material (1) by the first forming stroke (h_1) requires using the first and second measured values, and comparing the actual plastic deformation (s_ist) with the target plastic deformation (s_soll).

7. The method according to claim 1, further comprising specifying a tolerance range and if, after the first forming stroke (h_1) has been carried out, a difference between the actual plastic deformation (s_ist) and the target plastic deformation (s_soll) lies outside the tolerance range, then carrying out the second forming stroke (h_2) at the forming position (12).

8. The method according to claim 1, further comprising measuring an actual outer surface of the bar-shaped material (1), determining a deviation profile of the actual outer surface from a straight-line target outer surface, and determining the forming position (12) from the deviation profile.

9. The method according to claim 1, wherein the forming position (12) is determined from the deviation profile as an angle (α, β) about a longitudinal direction (L) of the bar-shaped material (1) and as a position along a travel axis (G) of the straightening hammer (8) along the longitudinal direction (L).

10. The method according to claim 1, further comprising placing the bar-shaped material (1) on two anvils (5, 6) spaced apart from each other such that the forming position (12) is arranged in a longitudinal direction (L) between the two anvils (5,6).

11. A straightening machine for non-straight, bar-shaped material (1) for carrying out a target plastic deformation (s_soll) at a forming position (12) of the bar-shaped material (1), comprising:

a traversing device including a straightening hammer (8) with an integrated measuring probe (7), a control system, including a memory configured to store a characteristic diagram (60) which displays a target plastic deformation (s_soll), an actual plastic deformation span for the bar-shaped material for a plurality of forming strokes, an actual plastic deformation (s_ist), and a characteristic curve (61) for the bar-shaped material (1) determined from the actual plastic deformation, wherein the control system:

determines the target plastic deformation at a forming position (12) of the bar-shaped material (1) a first forming stroke (h_1) from the target plastic deformation (s_soll), controls the straightening hammer (8) to move to the forming position (12), controls the straightening hammer (8) to carry out a first forming stroke (h_1), controls the integrated measuring probe (7) to measure the actual plastic deformation (s_ist) caused by the first forming stroke (h_1) and feed a measured value of the actual plastic deformation to the control system, generates the characteristic diagram (60) after the first forming stroke (h_1), and determines a second forming stroke (h_2) from the actual plastic deformation (s_ist) caused by the first forming stroke (h_1), the target plastic deformation (s_soll), and the characteristic curve (61).

12. The straightening machine according to claim 11, further comprising at least two anvils (3, 4) spaced apart from each other in a longitudinal direction (L) for supporting the bar-shaped material (1).

13. The straightening machine according to claim 11, wherein the measuring probe (7) includes a measuring head (7*a*) guided centrally through the straightening hammer (8) and the measuring head (7*a*) enables a distance measurement beyond an impact surface (8*a*) of the straightening hammer (8).

14. The straightening machine according to claim 11, wherein the measuring probe (7) is a tactile measuring probe, a measuring head (7*a*) of which projects centrally from a bore of the straightening hammer (8) and is configured to be retracted completely inside behind a striking surface (8*a*) of the straightening hammer.

15. The straightening machine according to claim 11, wherein the traversing device further includes a traversing axis (H) and is configured to be NC-controlled transversely to an outer surface of the bar-shaped material (1), and the straightening hammer (8) is arranged on the traversing axis (H).

16. The straightening machine according to claim 11, further comprising a measuring system for measuring an outer surface of the bar-shaped material (1) arranged along a receptacle (16) for the bar-shaped material (1).

17. The straightening machine according to claim 16, wherein the measuring system comprises oppositely arranged, rotatable holders (5, 6) for clamping the bar-shaped material (1) and measuring probes (2) arranged between the holders (5,6) next and adjacent to the clamped bar-shaped material (1).

18. The method according to claim 3, further comprising selecting the target plastic deformation (s_soll) as a maximum value of the plastic deformation span for the first forming stroke (h_1).

* * * * *